Jan. 9, 1962  J. K. ROYLE  3,016,064
HYDRAULIC PRESSURE CONTROL VALVE
Filed July 20, 1959
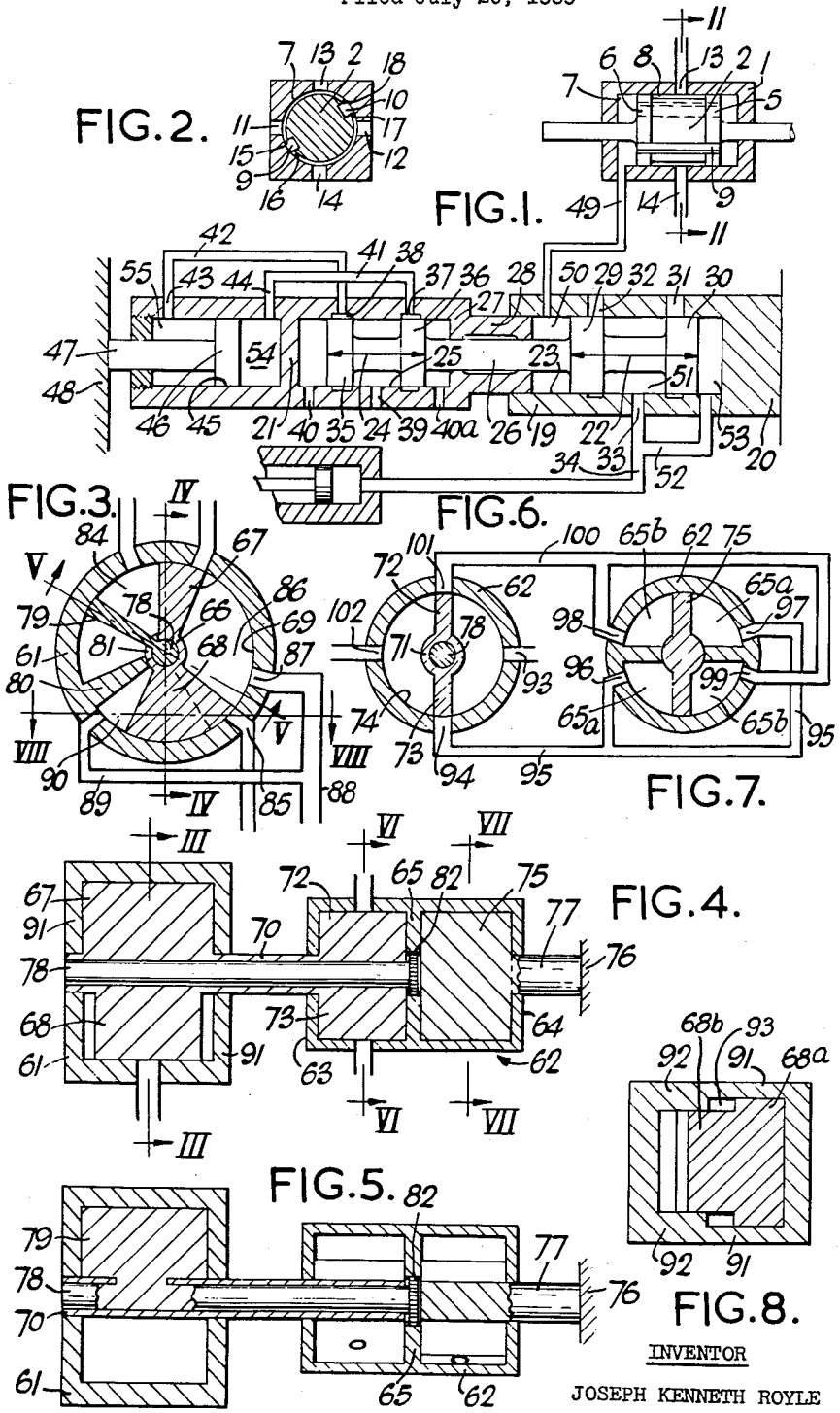
INVENTOR
JOSEPH KENNETH ROYLE United States Patent Office 3,016,064
Patented Jan. 9, 1962

3,016,064
HYDRAULIC PRESSURE CONTROL VALVE
Joseph Kenneth Royle, Manchester, England, assignor to National Research Development Corporation, London, England, a British corporation
Filed July 20, 1959, Ser. No. 828,296
Claims priority, application Great Britain July 28, 1958
7 Claims. (Cl. 137—620)

This invention relates to hydraulic valves in which there is relative movement between a valve member and a valve body, the movement being caused by the feeding of a pressure fluid supply to a chamber formed by co-operating parts of the valve body and the valve member. In such valves relative movement of the valve parts, such as occurs in operation of the valve, causes a variation in the volume of the chamber to which the pressure fluid supply is fed. In some cases this variation can disadvantageously affect the efficient operation of the valve.

According to the invention there is provided a hydraulic valve comprising first valve means having two parts, namely a first valve member mounted for movement in a first valve body, second valve means having two parts namely a second valve member mounted for movement in a second valve body, an actuator having two parts namely a body and a member movable relative to the body, one of the second valve parts being connected to one of the actuator parts, a displacement member operatively coupled to the second valve means and the actuator and co-operating with the first valve means to form a chamber for the reception of a liquid under pressure, relative movement of the first valve member in the first valve body operating the second valve means to control the actuator so as to cause movement of the said displacement member in such a sense as to substantially cancel out any variation in volume of the said chamber caused by the relative movement of the first valve member.

The valve is more particularly, though not exclusively, useful where the pressure fluid supply to the chamber formed by the valve bodies and the valve members has a low flow rate, as maintaining the volume of the chamber substantially constant assists in speeding up the rate of operation of the valve.

The invention will be more readily understood by the following description in conjunction with the accompanying drawing in which:

FIGURE 1 is a sectional elevation of one embodiment of the invention;

FIGURE 2 is a cross-section on line II—II of FIGURE 1;

FIGURE 3 is a cross-section on line III—III of FIGURE 4, illustrating another embodiment of the invention;

FIGURE 4 is a sectional elevation on the line IV—IV of FIGURE 3;

FIGURE 5 is a sectional elevation on the line V—V of FIGURE 3;

FIGURE 6 is a cross-section on line VI—VI of FIGURE 4;

FIGURE 7 is a cross-section on the line VII—VII of FIGURE 4; and

FIGURE 8 is a sectional view on line VIII—VIII of FIGURE 3.

In the embodiment of the invention as shown in FIGURES 1 and 2 a valve body 1 contains a spool 2 which acts as a variable resistance to the flow of a fluid from a pressure inlet to a pressure outlet. Two lands 5 and 6 are a close fit in bore 7 and between these lands there is a region 8 of slightly reduced diameter. Ports 9 and 10 extend radially into the body of the spool 2 and the full length of the spool, communicating with the ends of the bore 7. The ports 9 and 10 co-operate with ports 11, 12, 13 and 14 in the valve body 1, equally spaced around the bore 7. Ports 11 and 12 are connected by passages to the high pressure side of a hydraulic pressure supply pump and ports 13 and 14 are connected to the low pressure side of the said pump or to some convenient exhaust or drain.

There is a small flow of fluid from 11 to 14 and from 12 to 13 around the clearance 8 and the pressure in the ports 9, 10 is intermediate that obtaining in 11 and 12, and that obtaining in 13 and 14. The value of this pressure depends upon the rotational position of the spool 2 which governs the ratio between the pressure drops across the restrictions 15, 16 in the case of port 9 and the restrictions 17, 18 in the case of port 10, these two ports acting as potentiometers and having substantially the same pressures in them at any one rotational position of spool 2. This pressure is communicated to a further valve indicated generally at 19. This valve 19 has two valve bodies 20 and 21. Valve body 20 contains a spool 22 operating in bore 23. To the end of the spool 22 is connected a further spool 24 working in a bore 25 in valve body 21. The stem 26 connecting the two spools 22 and 24 passes through the end wall 27 of the valve body 21, this end wall being formed with a projection 28 which surrounds the stem 26 and is a sliding fit in bore 23 of valve body 20. Spool 22 has two lands 29 and 30 which are a sliding fit in bore 23 and cooperate with annular groove ports 31 and 32 which are connected to the high pressure and low pressure sides respectively of a hydraulic pressure supply system. In the central position of spool 22, lands 29, 30 substanitally close off ports 31 and 32.

Between lands 29 and 30 is a port 33 which is in communication, via passage 34, with a hydraulic ram, motor or the like.

Spool 24 has two lands 35, 36 which are a sliding fit in bore 25 and co-operate with annular groove ports 37 and 38. Between the lands 35 and 36 is a port 39 which is connected to the high pressure side of a hydraulic pressure supply and on the remote sides of lands 35 and 36 to the port 39 are further ports 40 and 40a which are connected to a suitable exhaust or drain which could be the low pressure side of a closed circuit hydraulic supply system.

Ports 37, 38 are in communication via passages 41 and 42, and ports 43 and 44, with a second bore 45 in valve body 21. Operating in this second bore is a piston 46 which is secured by stem 47 to a fixed member 48.

The operation of this embodiment of the invention is as follows. A pressure is selected by rotating spool 2, the pressure occurring in ports 9 and 10 being applied via passage 49 to chamber 50 in valve body 20. Spool 22 is moved to the right and opens port 31, allowing fluid from a hydraulic pressure supply to flow into chamber 51 and then out of port 33 to a utilisation outlet via passage 34. The pressure in passage 34 also passes via passage 52 to chamber 53 at the right hand end of the valve body 20. This pressure acts to oppose the thrust produced on spool 22 by the pressure in chamber 50. The spool 22 will finally come to rest at a position such that the pressure of the fluid flowing to the utilisation outlet via passage 34 is at the desired value, the two longitudinal thrusts on spool 22 balancing each other.

The edges of lands 29 and 30 may be slightly tapered to provide more gradual opening and closing of ports 31 and 32. This will reduce the large changes of pressure for small spool movements which would otherwise occur at low flow rates.

The movement of spool 22 also causes longitudinal movement of spool 24 in the same direction allowing fluid from the pressure supply to flow from port 39 through port 37 and via passage 41 to port 44 and thence into chamber 54 at the right hand end of bore 45. The pressure occurring in this chamber acts on the fixed piston 46 and moves the valve body 21 to the right. The movement of the valve body 21 causes the projection 28 to move further into the bore 23. This movement also closes the port 37 the projection 28 taking up an equilibrium position, as in a normal follow-up servo, and maintains the volume of chamber 50 substantially constant, irrespective of the movement of the spool 22. This greatly reduces the pressure drop in this chamber should a sudden movement of spool 22 occur due to a rapid increase in the demand at the utilisation outlet, which tends to cause the actual pressure at the utilisation outlet to fall below the selected pressure. This pressure drop in chamber 50 would otherwise occur due to the low flow rate through ports 9 and 10 in spool 2.

Similarly, should a fall in demand occur, the pressure in passage 34 will rise causing an increase in pressure in chamber 53. This will move the spool 22 to the left, reducing the fluid flow through port 31. At the same time this movement will cause spool 24 also to move to the left opening port 38 and allowing pressure fluid to flow into the left hand chamber 55 of the bore 45 via passage 42. Fluid can escape from chamber 54 via passage 41 and port 37 to drain outlet 40a. The pressure in chamber 55 causes the valve body 21 to move to the left causing the projection 28 to move into less engagement with bore 23. This movement also closes ports 37 and 38, projection 28 again taking up an equilibrium position as in a normal follow-up servo, and maintains the volume of chamber 50 substantially constant. This prevents an increase of the pressure in chamber 50 due to the slow leak rate from the chamber via ports 9 and 10 to the ports 13 and 14 in the valve body 1.

The action of preventing pressure fluctuations in the chamber 50 due to rapid movements of the spool 22 stabilises the operation of the valve and prevents undesirable time lag in the reaction of the valve during which the selected pressure is not maintained.

The invention is equally applicable to rotary type valves and FIGURES 3, 4, 5, 6 and 7 illustrate an embodiment which is the rotary equivalent of the embodiment illustrated in FIGURES 1 and 2.

The valve has two valve bodies 61 and 62, valve body 62 being divided into two parts 63 and 64 by a flange 65. The valve body 61 contains a valve member 66 with two vanes 67 and 68 operating in a bore 69. The vanes are mounted, or formed, on a hollow shaft 70. The shaft is connected to a further valve member 71, also having two vanes 72 and 73, operating in a bore 74 in the part 63 of the valve body 62. The other part 64 contains a valve member 75 again of vane formation, which is rigidly mounted on a fixed member 76 by an extension 77. The valve body 62 is capable of rotation relative to the fixed valve member 75. Carried within the hollow shaft 70 is a further shaft 78 which carries a valve member 79 in the form of a single vane. This vane is positioned between a vane shaped abutment 80 formed in the valve body 61 and the vane 67 of valve member 66, projecting through the wall of the hollow tube 70 by means of a slot 81, which is wide enough to allow relative rotational movement of the two valve members 66 and 79. The end of the shaft 78 remote from the valve member 79 is connected, for example by splines 82, to the flange 65 dividing the valve body 62.

The valve operates as follows. An initial pressure is selected, for example by a valve such as is comprised by the valve body 1 and spool 2 in FIGURES 1 and 2. This pressure is fed to chamber 84, which lies between vanes 67 and 79 and has hitherto been empty. Valve member 66 is rotated clockwise and opens port 85, allowing fluid from a hydraulic pressure supply to flow into chamber 86, between vanes 67 and 68, and then out of port 87 to a utilisation outlet via passage 88. The pressure in passage 88 also passes via passage 89 to chamber 90, between vanes 68 and 80. This pressure acts to oppose the thrust produced on the vane 67 by the pressure in the chamber 84. The valve member 66 will finally come to rest at a position such that the pressure of the fluid flowing to the utilisation outlet via passage 88 is at the desired value, the two rotational thrusts on valve member 66 balancing each other. The required ratios of the pressures in the chambers 84 and 90 can be obtained by making the vane 68 wider where it faces chamber 86 than where it faces chamber 90. This is more easily seen in FIGURE 8, the front or wider portion 68a engaging the normal end walls 91 of the valve body 61 and the narrower portion 68b engaging the locally thickened end walls 92. Sufficient space, 93, must be left between the thickened walls 92 and the wider portion 68a of the vane, to allow rotation of the valve member 66. This variation in vane width has the same effect as the differing areas of the end faces of the spool 2 in FIGURE 1.

The rotations of valve member 66 also rotates valve member 71 allowing fluid from a pressure supply to flow from port 93 through port 94 and via passage 95 to ports 96 and 97 to chambers 65a in the valve body 62. The pressure occurring in these chambers acts on the fixed member 75 and causes the valve body 62 to rotate in a clockwise direction, the chambers 65b thus becoming connected to exhaust via ports 98 and 99, passage 100 and ports 101 and 102. This movement also rotates shaft 78 and vane 79. The movement of the valve body 62 also tends to close the ports 94 and 101 once again by bringing them into register with the tips of the vane 72, the vane 79 taking up an equilibrium position, as in a normal follow-up servo, so maintaining the volume of chamber 84 substantially constant. As in the embodiment illustrated in FIGURES 1 and 2, this greatly reduces the pressure drop in chamber 84 should a sudden rotation of valve member take place due to a rapid increase in the demand at the utilisation outlet.

Similarly, should a fall in demand occur the pressure in pasage 88 will rise causing an increase in pressure in chamber 86. Reverse operation of the valve will occur thus preventing a pressure rise in chamber 84. In this case the initial movement of the vane 72 within the valve body 62 will cause fluid from the pressure supply to enter the chambers 65b by way of the port 101, the passage 100, and the ports 98 and 99. At the same time the chambers 65a will become connected to exhaust by way of ports 96 and 97, passage 95, and ports 94 and 102. The consequent movement of the valve body 62 will then as before tend to move the vane 72 back into the position in which it obstructs the ports.

I claim:
1. A hydraulic valve comprising first valve means having two parts, namely a first valve member mounted for movement in a first valve body, second valve means having two parts namely a second valve member mounted for movement in a second valve body, an actuator having two parts namely a body and a member movable relative to the body, one of the second valve parts being connected to one of the actuator parts, a displacement member operatively coupled to the second valve means and the actuator and co-operating with the first valve means to form a chamber for the reception of a liquid under pressure, and conduits for fluid under pressure between the interior of the second valve body and the interior of the actuator body, relative movement of the first valve member in the first valve body operating the second valve means to displace the fluid in at least one of said conduits and so control the actuator so as to cause movement of the said displacement member in such a sense as to substantially cancel out any variation in volume of the said chamber caused by the relative movement of the first valve member.

2. A hydraulic valve as claimed in claim 1 in which the said chamber is contained in the first valve body, the first valve body, the first valve member and the displacement member co-operating to form the said chamber.

3. A hydraulic valve as claimed in claim 2 in which the second valve body and the actuator body form a single body.

4. A hydraulic valve as claimed in claim 3 in which the actuator member is a fixed reaction member.

5. A hydraulic valve comprising first valve means having a first valve member mounted for movement in a first valve body, second valve means having a second valve member mounted for movement in a second valve body, a displacement member operatively coupled to a part of the second valve means and co-operating with a part of the first valve means to form a chamber for the reception of a liquid under pressure, an actuator having a body and a member mounted for movement relative to the body, an operative connection between the actuator and the part of the second valve means to which the displacement member is coupled, and conduits for fluid under pressure between the interior of the second valve body and the interior of the actuator body, movement of the first valve member relative to the first valve body operating the second valve means to displace the fluid in at least one of said conduits and so control the pressure of fluid acting on the actuator member so as to cause movement of the displacement member in a sense such as to maintain the volume of the said chamber substantially constant.

6. A hydraulic valve comprising first valve means having a first valve member mounted for movement in a first valve body, second valve means mounted for movement in a second valve body, a part of the said second valve means being mounted for movement in the first valve body, the said part and the first valve member co-operating to form a chamber in the first valve body for the reception of a liquid under pressure, an actuator having a member mounted for movement in a body, and conduits for fluid under pressure between the interior of the second valve body and the interior of the actuator body, relative movement of the first valve member in its valve body operating the second valve means to displace the fluid in at least one of said conduits and so control the pressure of fluid acting in the actuator member, the actuator moving the said part of the second valve means mounted in the first valve body so as to maintain the volume of the said chamber substantially constant.

7. A hydraulic valve comprising first valve means having a first valve member mounted for movement in a first valve body, second valve means having a second valve member mounted for movement in a second valve body, the said two valve members being connected together, an actuator comprising an actuator body and a fixed reaction member, the said actuator body forming an extension of the second valve body, a displacement member supported in the first valve body and being operatively coupled to the said second valve body and actuator body, and conduits for fluid under pressure between the interior of the second valve body and the interior of the actuator body, the displacement member co-operating with the first valve body and the first valve member to form a chamber for the reception of a fluid under pressure, a fluid inlet in the first valve body, movement of the first valve member in the first valve body controlling the flow of the fluid from the said inlet to a utilisation outlet, the pressure of the fluid at said utilisation outlet also being applied to the first valve member on the side remote from the said chamber, the first valve member thus being in a pressure balanced condition, movement of the first valve member in the first valve body causing movement of the second valve member in the second valve body, such movement controlling through the said conduits the pressure of a fluid acting on the actuator reaction member so as to cause movement of the actuator body and thus the second valve body and the displacement member so that the displacement member moves in the first valve body in a sense such as to substantially counteract the variation of chamber volume caused by the movement of the first valve member in the first valve body and thus substantially preventing sudden large variations in pressure of the fluid in the said chamber due to rapid movement of the first valve member.

No references cited.